United States Patent
Scarpellini

[11] Patent Number: 5,878,505
[45] Date of Patent: Mar. 9, 1999

[54] DEVICE FOR MARKING A MEASURING POINT

[76] Inventor: Felice Scarpellini, via Grumo, 6928 Manno, Switzerland

[21] Appl. No.: 760,970

[22] Filed: Dec. 5, 1996

[30] Foreign Application Priority Data

Dec. 5, 1995 [CH] Switzerland ............................ 03432/95
Jun. 4, 1996 [CH] Switzerland ............................. 1421/96

[51] Int. Cl.⁶ ............................ A63C 19/06; G01B 3/10
[52] U.S. Cl. ................................ 33/666; 33/1 H; 33/1 G; 33/624; 33/756; 473/490
[58] Field of Search ........................ 33/666, 1 H, 27.01, 33/27.03, 404, 413, 1 G, 624, 755, 756, 758, 759, 562; 116/222, 225, 209; 473/490

[56] References Cited

U.S. PATENT DOCUMENTS

| 661,483 | 11/1900 | Barrie | 33/413 |
| 1,037,147 | 8/1912 | Johnson | 473/490 |
| 3,668,781 | 6/1972 | Teter | 33/1 H |
| 5,427,383 | 6/1995 | Viens | 33/759 |
| 5,474,017 | 12/1995 | Mohebbi et al. | 116/209 |

FOREIGN PATENT DOCUMENTS

| 335759 | 3/1977 | Austria . |
| 1514357 | 2/1968 | France . |
| 449984 | 4/1968 | Switzerland . |

*Primary Examiner*—Christopher W. Fulton
*Attorney, Agent, or Firm*—Dilworth & Barrese

[57] ABSTRACT

The device comprises a pipe (1), in which a shaft (20) of a marking component (2) can be moved. The pipe (1) has a soil anchor (4) at the bottom. The component (2) has a head (21) at the top and can be lifted from a lowered position, in which the head (21) lies next to the top face (14) of the pipe (1) into the lifted position shown against the force of a spring (3). In the lifted position, the component (2) can be stopped by means of a bayonet lock. The device is inserted into the ground vertically at a measuring, e.g., on a soccer field, such that in the lowered position, the top (25) of the head (21) is flush with the ground surface. If the markings on the field need to be renewed, the corresponding components (2) are lifted and stopped. A cord is stretched between two components (2), along which cord a straight line can be marked, or a circle can be drawn with a cord around one of the components (2). The marking of the field can thus be rationalized and expensive re-measuring can be avoided.

20 Claims, 2 Drawing Sheets

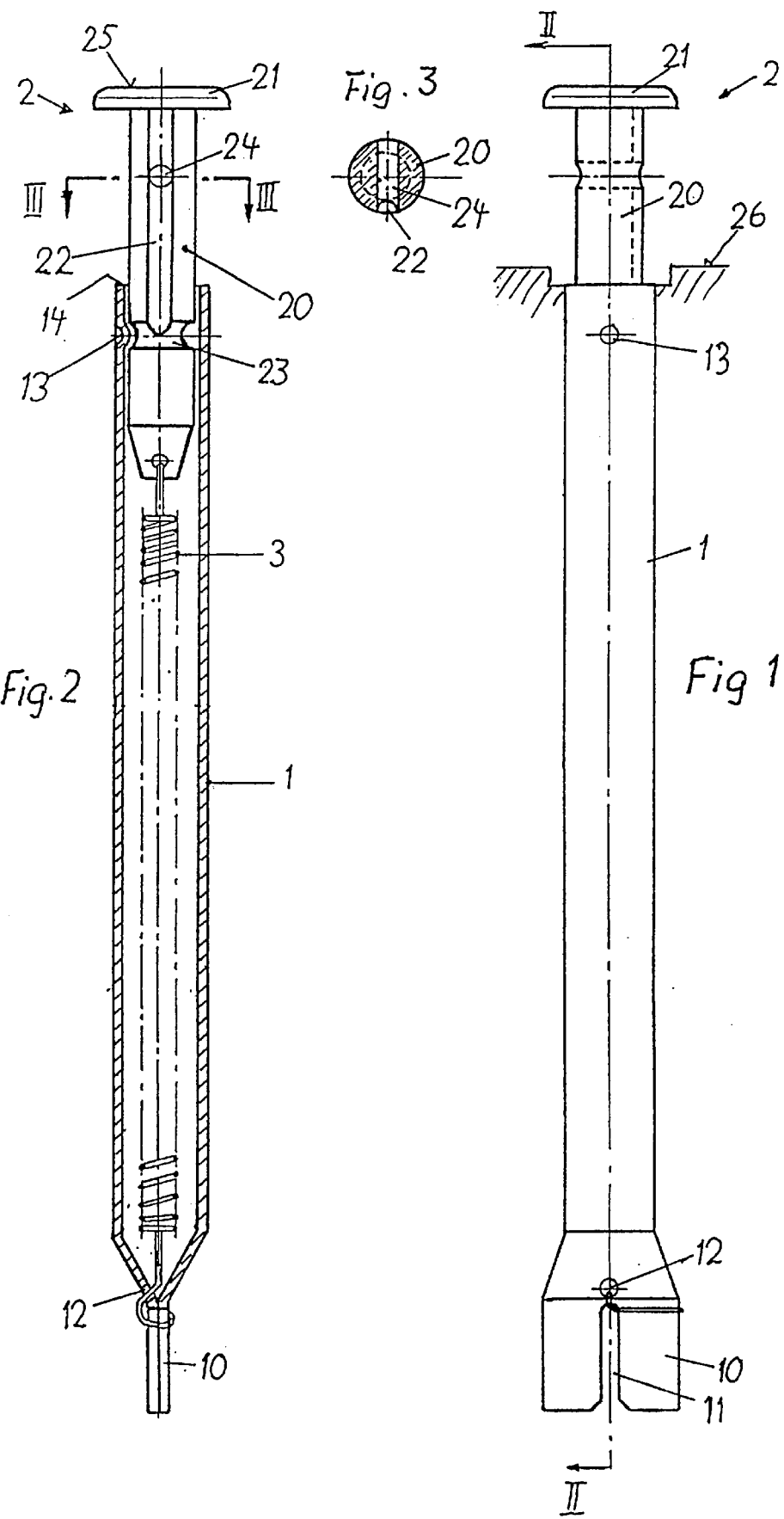

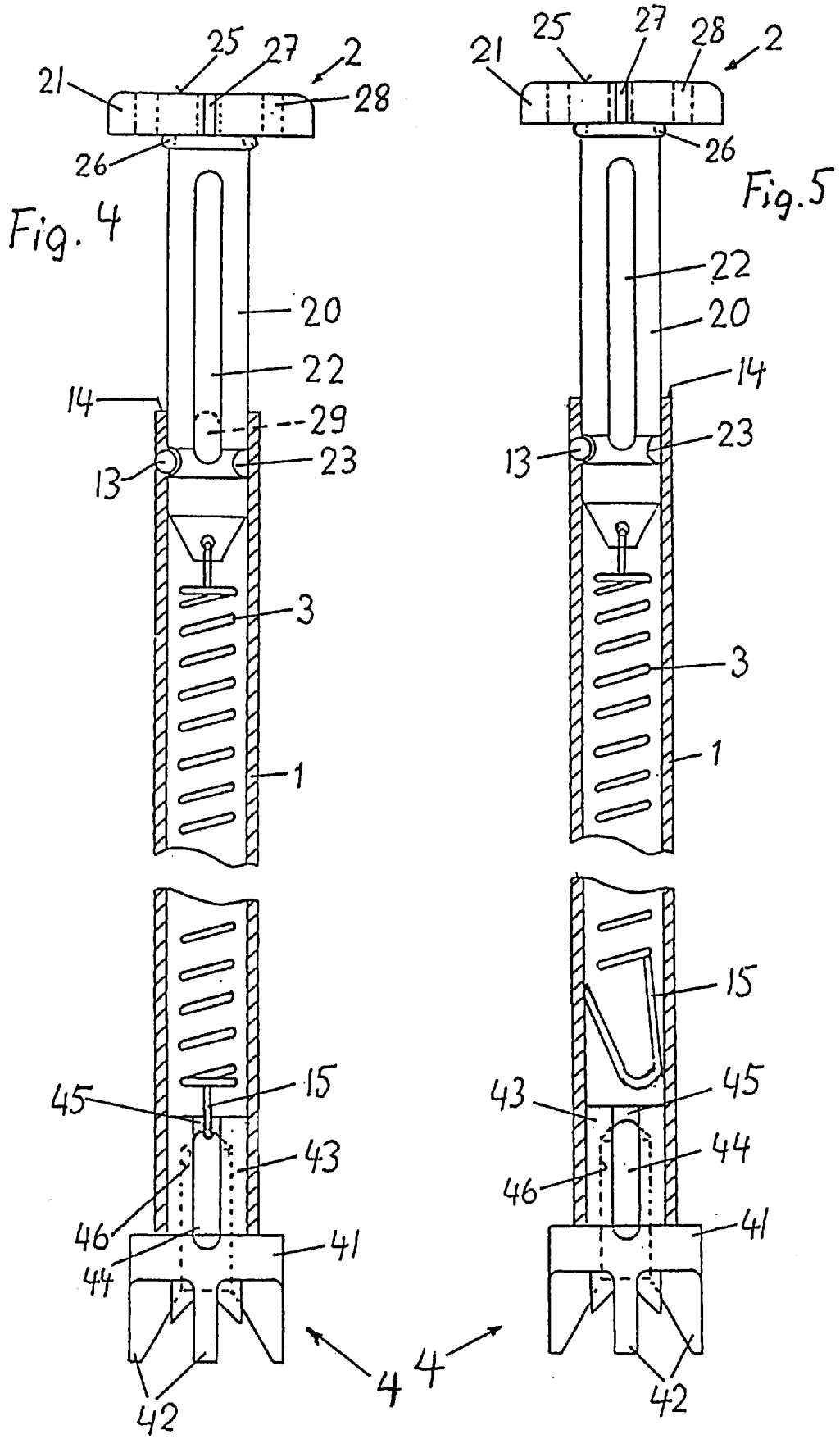

DEVICE FOR MARKING A MEASURING POINT

BACKGROUND OF THE INVENTION

The markings on soccer fields, consisting of straight lines and curves, must be renewed periodically. This is done by driving stakes into the ground at certain measuring points and stretching a cord between two stakes, along which cord a straight-line marking is applied to the grass, or by fastening a cord to a stake and inscribing a circle around the stake with the end of the cord. The stakes are then removed. Since the markings can shift on the grass over time, or since they are occasionally washed away, the measuring points for insertion of the stakes must be remeasured periodically, which is expensive.

SUMMARY OF THE INVENTION

This invention is based on the task of creating a device of the type indicated at the beginning that does not have this disadvantage. This task is solved by the combination of characteristics of a pipe (1) to be inserted in the ground (25) at least up to its top end (14) and a marking component (2) displaceable longitudinally in the pipe (1), which component can be shifted between a lowered position in which its top (25) is approximately flush with the ground (26), and a lifted position in which it protrudes above the ground (26), whereby the marking component (2) can be stopped in its lifted position.

BRIEF DESCRIPTION OF THE DRAWINGS

Below, methods of embodiments of the invention are explained based on the drawings, in which FIG. 1 illustrates a lateral view of the device, FIG. 2 illustrates a longitudinal sectional view along Line II—II in FIG. 1, FIG. 3 illustrates a cross-sectional view along Line III—III in FIG. 2, and FIGS. 4 and 5 illustrates two further methods of embodiments.

DESCRIPTION OF THE PREFERRED EMBODIMENTS

The device consists of cylindrical pipe 1, marking component 2 and pre-tensioned draw spring 3 of stainless steel, fastened at the bottom to pipe 1 and at the top to marking component 2. Pipe 1 has flattened area 10 with centered longitudinal slot 11. Pipe 1 can easily be driven into the ground with this. The longitudinal slit also facilitates concentric placement at a precisely measured survey point. Adjacent to flattened area 10, pipe 1 has at least one side opening 12, so that, entering water can flow out and seep away in any event. This prevents water from freezing in the pipe, when the weather is freezing, and from blocking component 2 and bursting pipe 1. Openings 12 also can be used to fasten the lower end of the spring. Pipe 1 preferably consists of an aluminum alloy, stainless or galvanized steel or of brass.

Component 2 consists of cylindrical shaft 20, the outside diameter of which is only slightly smaller than the inside diameter of pipe 1, and a one-piece flat, disk-like head 21 injection-molded onto it. Component 2 consists of plastic, preferably polyamide. It has at least one longitudinal groove 22, which, distanced from the lower end, passes into circumferential groove 23. Instead of longitudinal groove 22, a longitudinal slot also can be provided. At the top, shaft 20 has cross hole 24, to tie down a cord firmly. Pipe 1, adjacent to the top end, has indent 13 that forms an inward-pointing projection, penetrating into grooves 22, 23. Thus, a bayonet-like lock on component 2 reaches into the lifted end position shown, and component 2 is held captive in pipe 1. If component 2 is rotated so that indent 13 grips in longitudinal groove 22, it is drawn by spring 3 into the lowered position in which head 21 lies at the top front 14 of pipe 1. Head 21 here projects laterally over pipe 1 so that component 2 can be lifted simply. Component 2 is held firmly by spring 3 in the lowered position and, even with any friction increased by dirt, is drawn from the lifted into the lowered position.

In use, for instance on a soccer field, the devices are driven vertically into the ground at the measuring points on the field, such that top 25 of head 21 is approximately flush to ground surface 26 when component 2 is lowered. When the markings are to be renewed, corresponding components 2 are raised and stopped in the lifted position by rotation. Now either a cord can be stretched between two components 2, along which cord a straight line can be marked on the ground, or an arced line can be marked with a cord stretched radially around component 2. When the marking is finished, components 2 are rotated such that they are drawn into the lowered position. Lowered heads 21 thus do not interfere with play in any way.

With the device described, the measuring points need be measured only once. The time-consuming re-measurement and insertion and removal of rods is eliminated. This rationalizes marking the playing field.

Of course, the device can be used not only for marking soccer fields, but playing fields in general, and also, for example, for helicopter landing pads, airplane runways or underground engineering.

With the methods of embodiments in FIGS. 4 and 5, analogous parts are marked with the same reference numbers so a detailed description of these parts is superfluous. To insert these methods of embodiments into the ground, first a hole is driven in the ground, for instance, by means of a hollow punch. The device is then anchored in this hole.

In both methods of embodiments, soil anchor 4, made of plastic, for instance, polyamide, is pressed into the bottom end of the pipe, the head 41 of which anchor has a larger diameter than pipe 1. This prevents pipe 1 from being removed along with marking component 2 when it is pulled upward. Head 41 has bottom spike 42 for secure anchoring in the ground. Shaft 43, pressed into pipe 1, has longitudinal slit 44 that extends into head 41 and passes at top into longitudinal grooves 45. Longitudinal slot 44 with grooves 45 ensures that water penetrating into pipe 1 can flow out in any event. In addition, axial blind hole 46 can be formed in soil anchor 4, which improves the downward flow of water yet further.

Instead of indent 13 pursuant to FIGS. 1 and 2, in the methods of embodiments in FIGS. 4 and 5, ball 13 of stainless steel is pressed into a corresponding cross hole in pipe 1 and caulked there in any event. Ball 13 ensures good, gentle guidance in grooves 22, 23. Adjacent to head 21, in a groove in shaft 20, elastomer O-ring 26 is inserted. With marking component 2 lowered, this O-ring 26 seals against top 14 of pipe 1. This prevents water and dirt from entering. Head 21 has four longitudinal slots 27, distributed evenly over the circumference, which slots open inward into open drill holes 28. These longitudinal slots 27 and drill holes 28 enable rapid and precise mounting of the marking cord. Shaft 20 opposite circumferential groove 23 can have outgoing longitudinal groove 29. If head 21 is rotated such that ball 13 is engaged in this groove 29, head 21 is secured in the lifted position by rotation, which can be advantageous when stretching the marking cord.

In the methods of embodiments pursuant to FIG. 4, hook-shaped lower end 15 of spring 3 is hung in the path between the two longitudinal grooves 45. In this variation, shaft 43 can also sit in pipe 1 with a sliding seat. In the method of embodiments in FIG. 5, hook-shaped end 15 is clamped firmly in pipe 1. In this variation, slot 44 and grooves 45 can be eliminated as well, and drill hole 46 is formed as an open drill hole.

I claim:

1. Device for marking a measuring point, comprising a pipe (1) to be inserted in the ground (26) at least up to its top end (14) and a marking component (2) displaceable longitudinally in the pipe (1), which component can be shifted between a lowered position in which its top (25) is approximately flush with the ground (26), and a lifted position in which it protrudes above the ground (26), wherein the marking component (2) can be stopped in its lifted position, and wherein the marking component (2) is pre-stressed against the lowered position by a pre-tensioned spring (3).

2. Device pursuant to claim 1, comprising means (13,22, 23) for preventing lifting of the marking component (2) above the lifted position.

3. Device pursuant to claim 1, wherein the pipe (1) is circular at least in an upper section, the marking component (2) has a circular shaft (20) guided in the pipe (1), and the marking component (2) can be stopped in its lifted position by means of a bayonet lock (13, 22, 23).

4. Device pursuant to claim 3, wherein the shaft (20)) has at least one longitudinal groove (22) or one longitudinal slot that, spaced from the lower end of the shaft (20) passes into a groove (23) running in a circumferential direction, and into which a component (13) protruding inward from the pipe (1) penetrates.

5. Device pursuant to claim 4, wherein the penetrating component (13) is an indent or a body inserted into a cross hole.

6. Device pursuant to claim 1, wherein the marking component (2) has a head (21) that projects laterally over the pipe (1), and which, in the lowered position, lies against the upper face (14) of the pipe (1).

7. Device pursuant to claim 1, wherein the pipe (1) tapers downward, and wherein it has at least one lateral opening (12) adjacent to the lower end.

8. Device pursuant to claim 7, wherein the pipe (1) tapers downward due to a flattening (1).

9. Device pursuant to claim 1, wherein at the bottom end of the pipe, a soil anchor (4) is mounted, the width of which being larger than the diameter of the pipe (1).

10. Device pursuant to claim 1, wherein the marking component (2) is made of plastic.

11. Device pursuant to claim 1, wherein the marking component (2) has a head (21) that projects laterally over the pipe (1), and an O-ring (26) positioned adjacent thereto and which, in the lowered position, lies against the upper face (14) of the pipe (1).

12. Device pursuant to claim 1, wherein the marking component (2) has a disk-shaped head (21), the diameter of which is larger than that of the pipe (1), and which has four longitudinal slots (27) at its periphery, distributed evenly over the circumference, that serve to stretch a marking cord.

13. Device for marking a measuring point, comprising a pipe (1) to be inserted in the ground (26) at least up to its top end (14) and a marking component (2) displaceable longitudinally in the pipe (1), which component can be shifted between a lowered position in which its top (25) is approximately flush with the ground (26), and a lifted position in which it protrudes above the ground (26), wherein the marking component (2) can be stopped in its lifted position, and wherein the marking component (2) has a disk-shaped head (21), the diameter of which is larger than that of the pipe (1), and which has four longitudinal slots (27) at its periphery, distributed evenly over the circumference, that serve to stretch a marking cord.

14. Device pursuant to claim 13, wherein the marking component (2) is made of plastic.

15. Device pursuant to claim 13, wherein the pipe (1) is circular at least in an upper section, the marking component (2) has a circular shaft (20) guided in the pipe (1), and the marking component (2) can be stopped in its lifted position by means of a bayonet lock (13, 22, 23).

16. Device pursuant to claim 15, wherein the shaft (20) has at least one longitudinal groove (22) or one longitudinal slot that, spaced from the lower end of the shaft (20) passes into a groove (23) running in a circumferential direction, and into which a component (13) protruding inward from the pipe (1) penetrates.

17. Device pursuant to claim 15, wherein an O-ring (26) is positioned on the shaft (20) adjacent the head (21), the O-ring (26), in the lowered position, lying against the upper face (14) of the pipe (1).

18. Device pursuant to claim 13, comprising means (13, 22, 23) for preventing lifting of the marking component (2) above the lifted position.

19. Device pursuant to claim 18, wherein the marking component (2) is pre-stressed against the lowered position by a pre-tensioned spring (3).

20. Device pursuant to claim 13, wherein at the bottom end of the pipe, a soil anchor (4) is mounted, the width of which being larger than the diameter of the pipe (1).

* * * * *